United States Patent Office 3,124,904
Patented Mar. 17, 1964

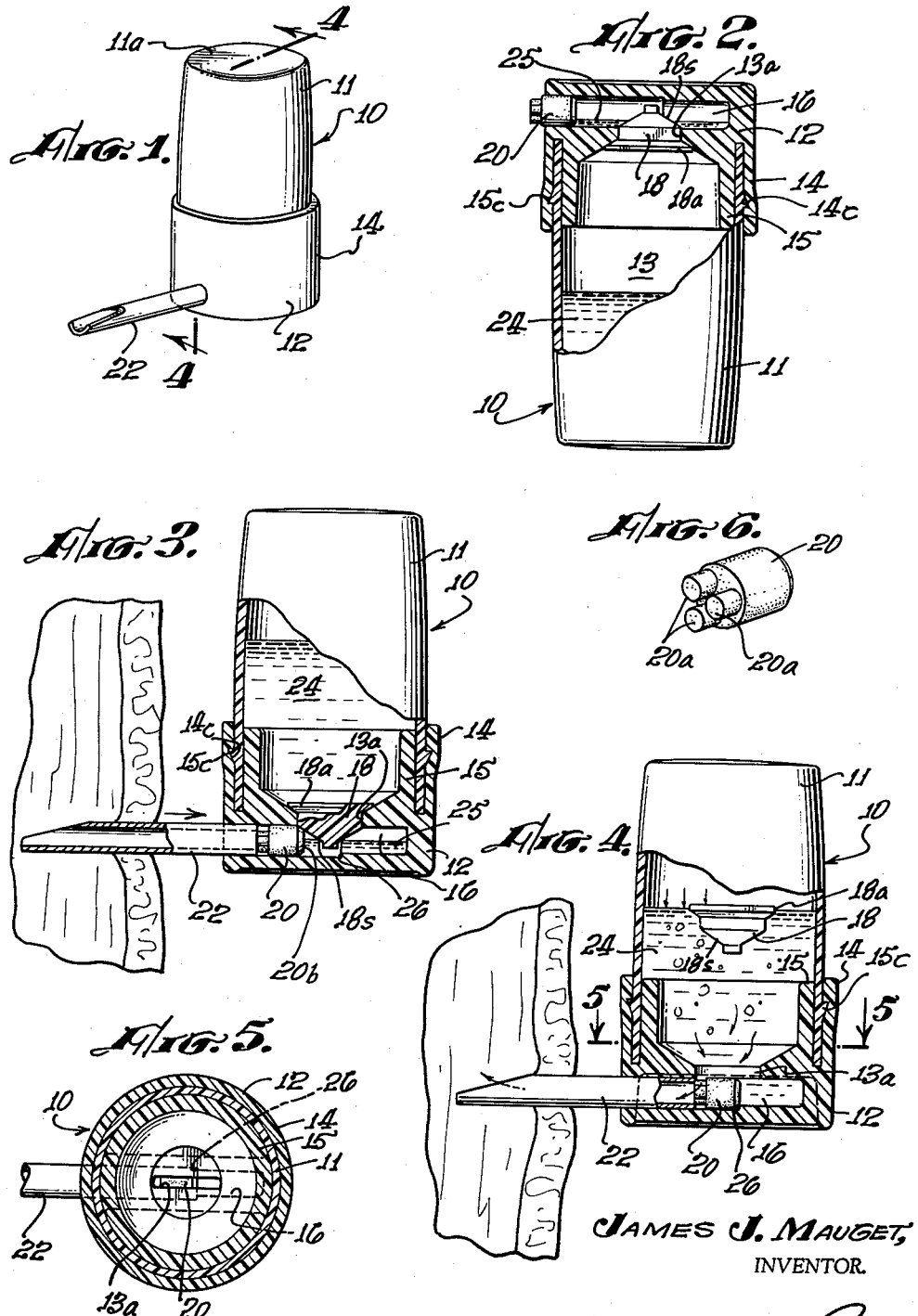

3,124,904
PLANT INJECTION DEVICE
James J. Mauget, 1043 Bilton Way, San Gabriel, Calif.
Filed June 18, 1962, Ser. No. 203,348
11 Claims. (Cl. 47—57.5)

The present invention relates generally to apparatus for injecting plants with liquids; and more especially to apparatus providing safe handling of toxic liquids in economical disposable containers within which a slight superatmospheric pressure can be developed for forcing the liquid contents out of the container and into a plant for treatment thereof by injection methods.

Injection of a plant is carried out by inserting a feeder tube into the stem of the plant deeply enough that the open inner end of the tube is inwardly of the cortex layer of the trunk. The equipment may be compared with a hypodermic needle used on humans; and the injection method is similar to intravenous injection or feeding since the result is the injection of the desired liquid directly into the sap stream of the plant.

Injection of plants, while not new, is not widely known and understood; but the potential results of such treatment are great. One aspect that has been widely developed is feeding small quantities of nutrient solutions to plants in order to remedy deficiencies in the nutrients naturally available to the plant from the surrounding soil.

A second aspect of great potential importance is the administration of liquids which effect growth control, prevention of diseases, and elimination of insects which feed upon the leaves or upon the woody structure of the plant. Such treatments are generally referred to as chemotherapy. Insects as well as virus and fungus infections can now be controlled in many situations by the use of antibiotics and/or systemic insecticides. Research has shown that insecticides now available are very effective in controlling, combating and often eliminating various insect pests. Thereby the spread of many diseases can be controlled. Chemotherapeutic methods often achieve results that are very difficult if not impossible to achieve by conventional methods of treating plants.

Liquids have in the past been administered to plants by gravity type reservoirs attached to feeder tubes. While these feeders are entirely satisfactory for many situations, especially administering nutrients, they are unsuitable for handling toxic materials. This is chiefly because the gravity feeders are not hermetically sealed and are therefore not suitable for handling potent modern systemic insecticides which are toxic to humans and which therefore should, for safety reasons, be shipped, sold, and otherwise handled only in completely sealed containers. Presently known insecticides, for example phosphate base insecticides, are so extremely effective they can be administered in small quantities, for example 3 to 6 millilitres. These materials are of such high toxicity to humans and warm blooded animals that official regulations make their sale and use in unsealed containers, even by licensed personnel, cumbersome and expensive.

Some of the disadvantages of gravity type reservoirs have been overcome by a container holding a small quantity of gas under pressure which provides a convenient means for quickly driving the liquid contents of the container out into a tree or other plant. Gaseous propellants have generally been placed in metal containers as they are completely gas tight. There are the advantages of low cost, lightweight and easy disposability to containers of synthetic resin or plastic; but most such materials are slightly permeable to gases and so the gas pressure may be lost after a few months. This severely limits the length of time a charged plastic container can be stored and greatly lessens the utility of a plastic container for these materials. A long "shelf life" is much to be desired to assure that the retailer always has on hand useful merchandise.

Thus it becomes a general object of my invention to provide means for safe handling and injection into plants of liquids that are highly toxic to humans and thus make available to the public at large such materials by eliminating the hazards involved with their use.

It is also an object of the invention to provide improved feeder means for positively injecting liquids into plants to increase the feeding rate of such apparatus.

A further object of the invention is to provide a container of novel design enabling injection materials to be stored over extended periods of time without incurring risk of failure of the gas drive when required to empty the contents into the plant.

These objects of the invention have been achieved by providing a novel disposable container for the liquid to be injected into a plant, said container comprising in a preferred form a pair of cup-like members which can be interengaged and locked together in engaged position. The container thus formed has an interior compartment for liquid contents and a passageway communicating at spaced positions with said interior compartment and with the exterior of the container, said passageway thus providing a path through which liquid in the compartment can be discharged from the container into the plant. A first displaceable means, preferably in the form of a removable plug, shuts off communication between the compartment and the passage while a second displaceable means, also typically a plug, closes the outer end of the passage to communication with the exterior of the container. The two displaceable means being spaced apart, there is a space within the passage into which may be placed a substance which, when mixed with the liquid in the compartment, evolves a gas which fills the space above the liquid within the container. This supplies the internal pressure to drive the liquid out of the container through the passage. Such mixing of the two materials takes place when the first displaceable means is removed or displaced to place the passage and the compartment in communication with each other.

How the above and other objects of my invention are attained will be better understood by reference to the following description and to the annexed drawing, in which:

FIG. 1 is a perspective view of a complete assembled container with the feeder tube inserted therein.

FIG. 2 is a combined side elevation and partial median section of a preferred form of container, showing the two displaceable means in place, as the device is stored.

FIG. 3 is a combined elevation and partial median section showing one of the displaceable means being pushed inwardly by the feeder tube into engagement with the other displaceable means as a step in getting ready for injection.

FIG. 4 is a view similar to FIG. 3 showing the device in operative condition with both displaceable means removed to positions in which the liquid in the container can be injected into the plant through the feeder tube.

FIG. 5 is a transverse section on line 5—5 of FIG. 4.

FIG. 6 is a perspective view of a cylindrical plug constituting one of the displaceable means closing the passage.

Referring now to the drawing, there is shown in FIG. 1 a fluid injection device constructed according to the present invention which comprises a two-part container indicated generally at 10. The container is made in two parts 11 and 12, each of which is generally cup-shaped and open at one end. The two parts combined, as in FIG. 2, enclose an interior space 13 in which the contents 24 are placed. Member 11 is preferably somewhat elongated or tubular in shape and is referred to as the cup. It is closed at one end by an integral wall 11a. The open end of the cup is closed by 12, a member herein called the cap. It carries means cooperating with the side walls of cup 11 in a manner to interlock the two members and prevent their accidental disengagement.

As may be seen in FIG. 2 particularly, cap 12 carries a pair of spaced annular skirts 14 and 15. The inner skirt 15 is designed to fit snugly within and engage the inner cylindrical surface of the cup in a manner to effect a fluid tight seal between the inner skirt and the cup wall. It will be appreciated that internal pressure within the container, tends to improve or increase the sealing contact between the annular skirt and the cup wall, thus assuring that the liquid contents of the container are securely enclosed.

The outer skirt 14 is of a diameter to slide over the outer surface of the cup wall and is provided internally with a groove 14c adapted to receive an annular locking ridge 15c on the outer face of the cup.

As shown in FIG. 2, the locking ridge is preferably of angular cross-section with a shoulder at one side. The groove 14c, being complementary in shape, firmly engages the shoulder on the locking ridge. This means of interlocking the two parts of the container firmly resists forces tending to pull the two apart. To assemble the two parts of the container, the cap is simply pushed down over the open end of the cup, the outer skirt being forced outwardly by locking ridge 15c until the groove is in registration with the ridge, when the resiliency of the outer skirt causes the skirt to contract, seating the ridge within the groove. The annular space between the two skirts 14 and 15 is preferably tapered slightly inwardly of the skirts in order to improve the tightness of the final engagement of the cup wall with the two skirts.

The container may be made of any suitable material, or materials, since it may be preferred to use different materials for the cup and the cap. Glass is a satisfactory material for the cup for many purposes, since it is chemically inert with respect to liquids which might be used and is also transparent. However, the novel design of the present container is especially adapted to making both the cup and the cap of a molded synthetic resin, as for example a nylon or a polyethylene resin. Both of these materials are sufficiently inert chemically with respect to liquids which may be placed in the container and may be sufficiently translucent that the liquid level within the container can be determined by inspection from outside. In addition, synthetic resins or plastics have the advantage of being very shock resistant and therefore they greatly reduce possible hazards arising from breaking the container by dropping it.

Cap 12 is typically made of a low or medium density polyethylene or a material having similar physical characteristics in order that the cap may be slightly elastic, permitting the cap to expand as it moves over the locking ridge 15c, as described.

One of the two members or parts of the container, but preferably cap 12, is provided with a fluid passage 16 which communicates at one end with the exterior of the container and, at a position spaced therefrom, with the interior compartment 13 of the container. The axis of fluid passage 16 is preferably substantially at right angles to the central axis of the container and cup 11, for reasons which will become apparent.

The interior space 13 of the container is defined in part by the inner surfaces of cup 12. These surfaces taper inwardly and downwardly when the cup is inverted in the position of FIGS. 3 and 4 in order to provide drainage into passage 16 for all of the liquid within the compartment 13. At the junction between the interior compartment and passage 16, the walls of the cap define an elongated, narrow passage 13a which may be regarded as being a portion of the interior compartment. The advantage of the narrow, elongated shape will become apparent. However any other suitable shape may be used if desired.

In order to close off the passage 16 from communication with the main compartment 13 until such time as it is desired to empty the container of its contents, a first displaceable means in the form of plug 18 is provided. Plug 18 has a body of narrow elongate cross-section, shaped to fit within opening 13a and fill this opening to prevent the transfer of any material between passage 16 and compartment 13, or vice versa. At one side of the main body portion, plug 18 has an outwardly extending shoulder 18a which engages the side walls of cap 12 and prevents the plug from being pushed through opening 13a and into passage 16 by any internal pressure within compartment 13.

As may be seen particularly in FIG. 3, the portion of plug 18 extending into passage 16 is tapered centrally to provide an inclined surface 18s which may be utilized as a cam surface in the displacement of the plug from opening 13a, as will be described.

In order to close off the passage to communication with the exterior of the container, a second displaceable means in the form of plug 20 is located within passage 16, preferably near the outer end thereof as shown in FIG. 2. Passage 16 is preferably made circular in cross-section to conform to one end of feeder tube 22 that is insertable into the outer end of the passageway, as shown in FIG. 3. The size of the tube and passageway are such that the frictional engagement between the tubes permits the container to be supported securely on the end of the tube and that the tube will not be easily pulled out of the passageway.

To conform to the circular shape of passageway 16, plug 20 is likewise circular in cross-section and engages the wall of the passage frictionally to obtain a tight fit therewith. This fit between the plug and the cylindrical passage wall is preferably tight enough to insure the exclusion of dirt and moisture from passage 16 when the plug is in the position of FIG. 2 but is not so tight but what the plug can be moved inwardly within the passage.

When initially filled, the container is in the upright position of FIG. 2 and a measured quantity of liquid 24 is placed within the cup. This liquid is any material which it may be desired to inject into a plant, either a nutrient or an insecticide. It may be that the material itself is a liquid or it can be an aqueous solution of a solid substance. Cap 12 is then placed over the open end of cup 11 and the container is closed. Plug 18 having previously been positioned as shown in FIG. 2, the interior compartment is now tightly sealed against loss of any of liquid 24 or fumes therefrom.

Either before placing the cap on the cup or afterwards, a small amount of a substance 25 is placed in passage 16, assuming plug 18 to be already in position, the passage is closed at its outer end by inserting plug 20, as shown in FIG. 2. The substance 25 is one which when mixed with the liquid in main compartment 13 evolves a gas. While any suitable combination of two materials may be used, a typical one is the use of an aqueous solution of potassium bicarbonate in passage 16 with a phosphate base insecticide in compartment 13. The insecticide is acid and when mixed with the potassium bicarbonate solution produces a small amount of carbon dioxide. The evolved gas, of course, rises through the liquid to the top of the container space. When the container is in the operating position of FIGS. 3 and 4, the gas is in the upper portion of cup 11. This gas presses on the upper surface of the liquid and drives the liquid out of the container.

Mixture of the liquid 24 with the substance 25 is brought about by inserting feeder tube 22 into the end of passage 16 and forcing plug 20 inwardly to the position shown in FIG. 3. Here plug 20 encounters one of the tapered sides of plug 18 with the result that further inward movement of plug 20 causes plug 18 to be forced upwardly out of opening 13a. The plug 18 will often float in the liquid at 24 or it will lie loose on the bottom of space 13. With the plug displaced, liquid 24 flows through into the passage 16.

The inner end of plug 20 is preferably tapered at 20b in order to provide a surface inclined at approximately the same angle as the inclined surface 18s on plug 18 to reduce the friction between these two elements and allow the plug 20 to raise plug 18 out of opening 13a by cam action against the inclined surface 18s.

It will be noticed in FIG. 3 that passage 16 is provided with a shoulder 26 which is designed to limit the inward travel of plug 20 to the position shown in FIG. 4. In this position plug 20 is intermediate the two ends of opening 13a, allowing free communication with sections of passage 16 at each side of plug 20. This prevents solid material 25 from being trapped ahead of the plug as it is driven inwardly of the passage and thereby cut off from the liquid 24 with the result that the quantity of gas evolved is reduced.

It will be noted that the outer end of plug 20 is provided with a suitable formation, typically three small cylindrical projections 20a, shown in FIG. 6, which engage the end of tube 22. The purpose of these projections is to prevent the inner end of tube 22 from being sealed against the entry of liquid by engagement with a flat surface on the end face of plug 20. Any other suitable roughened configuration on the face of plug 20 which will allow liquid to pass between the plug and the tube and into tube 22 is satisfactory for this purpose.

Although the tube may be driven into a plant stem in any convenient and suitable manner, it is preferred to set it by means of the tool shown and described in my U.S. Patent No. 2,796,701, issued June 25, 1957, for "Tool for Placing Feeding Tubes in Plant Stems." Once the feeder tube 22 has one end set firmly in a plant stem as shown in FIG. 4, the free outer end of the feeder tube is inserted in the open end of fluid passage 16 and the container is pressed axially of the tube to effect relative inward movement of the tube and displacement of plug 20 as just described. This sequence of operations is preferred since a gas tight and liquid tight seal between the feeder tube and the container is thus effected before either of the displaceable means 20 and 18 are sufficiently removed from their normal positions to prevent the escape of any of the toxic contents of the container. Thus, the contents are dispensed only after the tube 22 is in place in the plant stem and sealed to the container, rendering use of the device entirely safe.

The body of gas above the liquid is in direct contact with the liquid and exerts enough pressure thereon to drive it through tube 22 and into the plant stem. It has been determined by experiment that a dosage of 3 millilitres can be emptied from a container of this character within two minutes with an initial gas pressure of 4 p.s.i. The quantity of material 25 need be very small to produce the required gas volume, since the space above the liquid in compartment 13 may be only of the order of 3 or 4 millilitres in volume. The gas within the pressurized container not only exerts a driving force on the liquid but prevents the formation of a sub-atmospheric pressure in the upper portion of the container which might otherwise develop and slow up the removal of the liquid from the container.

One advantage of the invention is that when the container is empty, it remains essentially sealed and is still tamper-proof against opening. This permits handling without danger to personnel. Accordingly, the disposal of the used containers is safe and avoids any problems of contact with the toxic materials or arising from attempted re-use of the unit, as can be done with conventional bottles.

From the foregoing description, it will be understood that various changes in the design, shape and detailed construction of my improved container may occur to persons skilled in the art without departing from the spirit and scope of my invention. Accordingly, it is to be understood that the foregoing description is considered to be illustrative of, rather than limitative upon, the invention as defined by the appended claims.

I claim:
1. A device for injecting a quantity of liquid into the stem of a plant, comprising:
   a container having an interior compartment and a passage communicating at one end thereof with the exterior of the container and also communicating with the inner compartment through a port located at a position spaced from said one end of the passage, said passage being adapted to receive a feeder tube at its outer end;
   a quantity of liquid in the compartment;
   a first displaceable means closing said port to prevent communication between the passage and the compartment;
   a second displaceable means closing the passage to communication with the exterior of the container, said two displaceable means being spaced apart and forming a sealed secondary compartment within the passage;
   the second displaceable means being movable within the passage to engage and displace from the port the first displaceable means to place the passage and compartment in communication with each other;
   and a quantity of a substance in the secondary compartment that evolves a gas upon being mixed with the liquid from the first mentioned compartment and drives the liquid out of the container through the passage.

2. A device as in claim 1 in which the container comprises two cup-shaped members each open at one side and interengageable to close their open sides, and means interlocking the two members to prevent their disengagement.

3. A device as in claim 1 in which the container is molded from a synthetic resin.

4. A device as in claim 1 in which the axis of the passage is generally perpendicular to the axis of the liquid container and the passage opens at one side of the container.

5. A device as in claim 1 in which the second displaceable means frictionally engages the wall of the passage and is movable inwardly of the passage by engagement with the feeder tube.

6. A device as in claim 5 in which the passage is provided with means limiting the inward travel of the second displaceable means.

7. A disposable container for a quantity of a liquid to be injected into a plant, comprising:
   a cup closed at one end and open at the other end;
   a cap closing the open end of the cup to form a container enclosing an interior compartment adapted to hold the liquid to be injected into a plant,
   said container having a passage communicating at spaced positions with the interior compartment and with the exterior of the container;
   a first displaceable means shutting off communication between the compartment and said passage;
   and a second displaceable means closing the passage to communication with the exterior of the container, the two displaceable means being spaced apart to leave an interior space in the passage, the second displaceable means being movable within the passage to engage and displace the first displaceable means to place the passage and compartment in communication with each other.

8. A container as in claim 7 in which the second displaceable means frictionally engages the wall of the passage and is movable inwardly of the passage by a force applied to said second displaceable means and directed axially of the passage.

9. A disposable container as in claim 7 in which the passage is in the cap.

10. A disposable container for a quantity of a liquid to be injected into a plant, comprising:
   a cup closed at one end and open at the other end;
   a cap closing the open end of the cup to form a container enclosing an interior compartment adapted to hold the liquid to be injected into a plant,
   said container having a passage communicating at one end thereof with the exterior of the container and communicating with said interior compartment through a port spaced inwardly from said one end of the passage;
   a first displaceable plug closing the port and projecting into the passage;
   a second displaceable plug having a body frictionally engaging the walls of the passage and slidable in the passage between a first position near said one end thereof closing the passage to communication with the exterior and spaced from the first plug, and a second position in the passage at which the first plug is engaged and displaced into the interior compartment by engagement with the second plug, the second plug being movable in the passage to a third position uncovering at least part of said port to establish communication between the interior compartment and the exterior of the container through a portion of the passage; and means for moving the second plug from the first position to the second and third positions.

11. A disposable container as in claim 10 that also includes:
   a hollow discharge tube receivable into the end of the passage to engage the second plug as said means for moving the second plug;
   and means carried by the second plug for spacing the end of the discharge tube from the body of the second plug to admit fluid from the port into the inner end of the tube when the plug is in the third position.

References Cited in the file of this patent
UNITED STATES PATENTS
2,577,687    Lee _____ Dec. 4, 1951